UNITED STATES PATENT OFFICE.

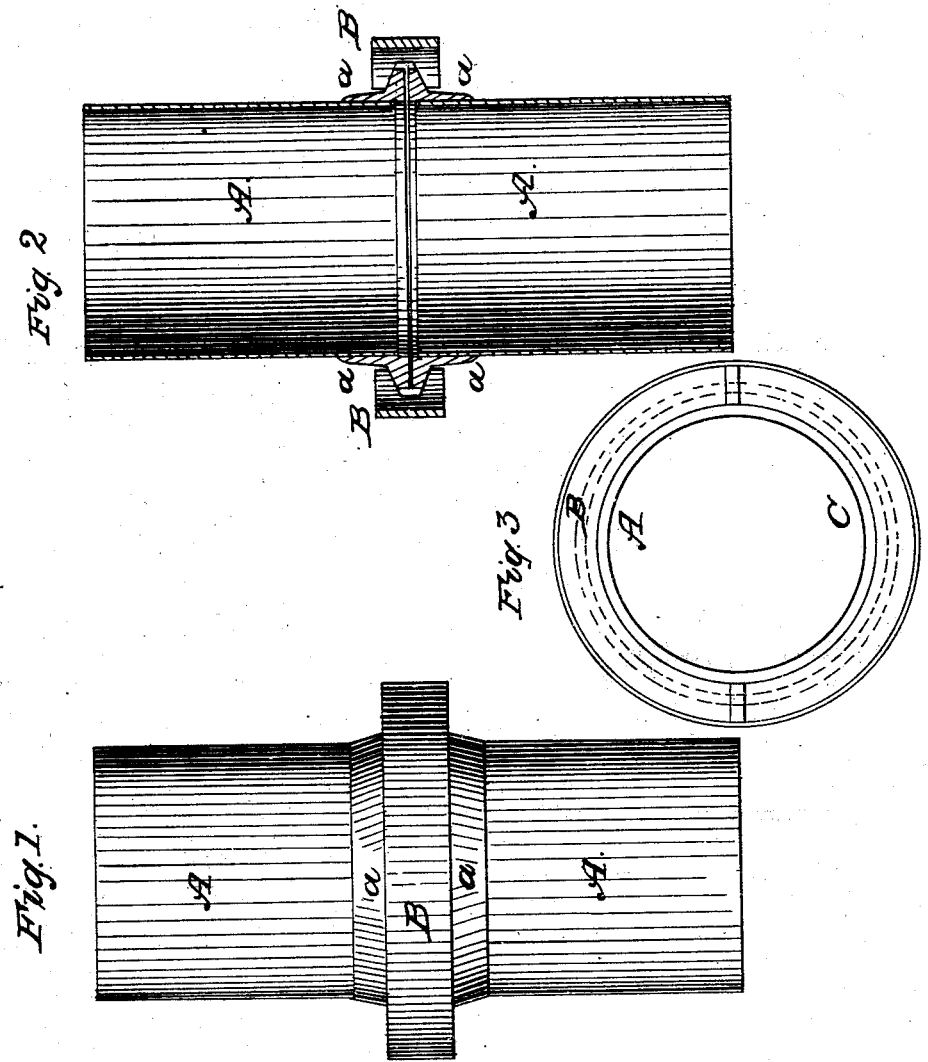

A. R. TREADWAY AND S. R. WARNER, OF NEW HAVEN, CONNECTICUT.

IMPROVEMENT IN CONNECTING TIN TUBING.

Specification forming part of Letters Patent No. 41,551, dated February 9, 1864.

*To all whom it may concern:*

Be it known that we, A. R. TREADWAY and S. R. WARNER, of New Haven, in the county of New Haven and State of Connecticut, have invented a new and useful Improvement in the Manner of Coupling Tin-Tubing for Steam-Heating Purposes; and we do hereby declare the following to be a full, clear, and exact description of the same, when taken in connection with the accompanying drawings, and the letters of reference marked thereon, and which said drawings constitute part of this specification, and represent, in—

Figure 1, a side view of a part of two sections of tubing coupled together; Fig. 2, a longitudinal section of the same, and in Fig. 3 an end view.

Same letters of reference indicate like parts.

Our invention relates to the manner of connecting tin tubing for the purpose of heating by steam. Until our own introduction of this kind of tubing for this purpose cast-iron pipe had been used, and the sections bolted together through flanges cast on the ends of each section.

In substituting tin tubing for cast-iron we first turned up the end of the tin onto a flange, which had been previously slipped on over the pipe, and then bolted the flanges on the ends of the two sections together, as we formerly did iron pipes, but in so doing we found it very difficult to make tight joints. These difficulties suggested to us the invention for which we now ask security by Letters Patent.

Our invention consists in soldering the couplings to the different sections of pipe previous to making the connections, whereby the principal difficulty was overcome.

Letters Patent were issued to us as assignees of S. R. WARNER, one of the inventors in the present case, dated March 17, 1863, for an improvement in couplings for tin tubing, designed to overcome the difficulties experienced in bolting together the different sections.

In illustrating our invention we show it as in applying the said coupling.

To enable others skilled in the art to use our invention, we will proceed to fully describe the same.

We make our tin tubing A in the ordinary manner. The parts of the coupling *a a* we make of cast-iron, and coat the inside with tin, then place one part over each end of the sections of tubing, (see Fig. 2,) always taking care that the tubing fits the parts of the coupling. Then solder the tube and coupling together in the ordinary manner of soldering. The said coupling, as fully described in the aforesaid Letters Patent, is joined as follows: An inclined flange, *c*, (see Fig. 2,) is made upon the rings *a a*. After placing the ends of two sections of tubing together with a ring of packing between them, we set two or more segments B C—the inner surface of each is made to correspond with the inclined flanges *c c*—over the said flange. (See Figs. 2 and 3.) Then force over all a ring, whose interior is conical. (See Fig. 2.) This binds the two sections firmly together.

Having fully described our invention, we do not claim uniting two sections of tin tubing when the same is done by turning up the ends of said tubing against flanges or couplings which are to be bound together, bearing against the said turned-up ends, as that is not new, a similar arrangement being shown in the patent of Uel West and Nathan Thompson, June 27, 1848, and also to S. R. WARNER, aforesaid, dated September 10, 1851; but What we do claim as new and useful, and desire to secure by Letters Patent, is—

The application of tin tubing to the purpose of heating by steam, when the different sections of the same are united by soldering to the parts of the couplings, substantially as herein specified.

A. R. TREADWAY.
S. R. WARNER.

Witnesses:
LYMAN TREADWAY,
JOHN E. EARLE.